(12) United States Patent
Wolfson et al.

(10) Patent No.: US 6,340,946 B1
(45) Date of Patent: Jan. 22, 2002

(54) METHOD FOR DETERMINING STORM PREDICTABILITY

(75) Inventors: Marilyn Wolfson, Acton; Barbara Forman, Framingham, both of MA (US); Robert Hallowell, Nashua, NH (US); Michael Moore, Bedford, MA (US); James Wilson, Boulder; Sandra Henry, Denver, both of CO (US)

(73) Assignee: Massachusetts Institue of Technology, Cambridge, MA (US)

( * ) Notice: Subject to any disclaimer, the term of this patent is extended or adjusted under 35 U.S.C. 154(b) by 0 days.

(21) Appl. No.: 09/631,157

(22) Filed: Aug. 3, 2000

(51) Int. Cl.$^7$ .............................................. G01S 13/95

(52) U.S. Cl. ......................... 342/26; 342/175; 342/176; 342/195

(58) Field of Search ............................ 342/26, 27, 28, 342/175–186, 192–197, 361–366; 382/100, 103, 162, 165, 168, 170, 181; 702/1, 2, 3, 4; 706/928, 930, 931

(56) References Cited

U.S. PATENT DOCUMENTS

| 4,684,951 A | * | 8/1987 | Baumer ...................... 342/362 |
| 5,959,567 A | * | 9/1999 | Wolfson et al. ................ 342/26 |
| 5,974,360 A | * | 10/1999 | Otsuka et al. .................. 702/3 |

\* cited by examiner

*Primary Examiner*—Bernarr E. Gregory
(74) *Attorney, Agent, or Firm*—Testa, Hurwitz & Thibeault, LLP

(57) ABSTRACT

A method and apparatus for determining the predictability of an element in a weather radar image. An image filter approximating the envelope of the organized storm radar image is applied to a pixel in a received weather radar image to generate a processed pixel value. A variability value is determined from the variation in the pixel values of the neighboring pixels which lie within the image filter. The predictability is generated from the processed pixel value and the variability. Pixels having high processed pixel values and low variabilities typically correspond to pixels within a strong organized storm and, therefore, are more predictable. Pixels having low processed pixel values and high variabilities, such as pixels representative of airmass storms, generally have lower predictabilities.

25 Claims, 16 Drawing Sheets

ELLIPTICAL FILTER AT 0 DEG.

ELLIPTICAL FILTER AT 45 DEG.

UNFILTERED WEATHER RADAR IMAGE
PRIOR ART

FILTERED WEATHER RADAR IMAGE
PRIOR ART

TRACK VECTORS
PRIOR ART

PREDICTED WEATHER RADAR IMAGE
PRIOR ART

FLOWCHART OF METHOD OF TRACKING AN ORGANIZED STORM
PRIOR ART

VERTICALLY INTEGRATED LIQUID WATER
(NON-DIMENSIONAL SCALE)

METHOD FOR DETERMINING STORM PREDICTABILITY

GOVERNMENT INTEREST

The subject matter described herein was supported in part by the Federal Aviation Administration under contract No. DTFA01-91-Z-02036. The government has certain rights in the invention.

FIELD OF THE INVENTION

The invention relates generally to a method and apparatus for determining the predictability of elements in a weather radar image. In particular, the invention relates to a method for generating a predictability score indicative of the predictability for a pixel in the weather radar image.

BACKGROUND OF THE INVENTION

Short term (e.g., 30–120 minutes) weather predictions of the location of storms are extremely important to many sectors of the population. For example, aviation systems, traffic information systems, power companies and commuters realize important safety and economic benefits from accurate predictions of organized storms. Unfortunately, the classic weather problem of determining the motion of organized storms has not led to accurate automated forecasts for the short term time scale.

Organized storms are large scale meteorological events, often resulting from frontal discontinuities or cyclonic disturbances. Organized storms include clusters or groups of cells which occur alone or in larger line storms, hurricanes, tropical storms or in association with low pressure centers. Large single cells, including hailstorms, tornadic cells and supercells, are also considered organized storms due to their longer lifetime and broader geographic range. Conversely, airmass storms are small-scale, unorganized convective elements of limited duration and geographic range. Any convective element (i.e., cell) can be categorized as part of an organized storm or an individual airmass storm.

The storm tracking community has attempted for years to determine not only storm advection (i.e., the horizontal motion due to air currents) but also the growth and decay of the organized storm with no significant success. The lifetime of individual cells within the organized storm can be 20 minutes or less. New cells frequently grow near old decaying cells, but not necessarily along the direction of motion of the old cells. As a result of this discrete propagation (i.e., growth and decay process), storm motion can appear to deviate from cellular advection. For short term predictions (e.g., 20 minutes or less), the tracking of cell motion yields accurate predictions. Longer term predictions (e.g., greater than 20 minutes) based on the tracking of cell motion are considerably less accurate.

Tracking the large scale motion, or envelope, of the organized storm is one method that have been used to improve short term forecast accuracy. See, for example, U.S. Pat. No. 5,959,567 in which the method for tracking organized storms is based on the principle that large scale storms tend to decorrelate less rapidly with time. The method includes applying an image filter to a weather radar image to obtain only the large scale features within the image. The large scale features are tracked to determine the motion of the envelope and to generate a predicted image. Image filters that approximate the storm envelope are preferred because they typically yield predicted images with higher accuracy.

SUMMARY OF THE INVENTION

Although predicted images are useful for determining the future location of organized storms, it is desirable to determine the predictability, or likelihood, that the specific features within the predicted image will occur. Predictability can provide a level of confidence for reliance on the predicted image for planning future activities.

The invention relates to a method and apparatus for determining the predictability of a selected element within a weather radar image. The method is an improvement on known methodologies for tracking large scale features in weather radar images, and can be implemented using various image processing techniques. The images generated by the method of the present invention provide an indication of the predictability, or likelihood, that the features in predicted weather radar images will happen. The method is based on the principle that large scale storms tend to decorrelate less rapidly with time. By taking weather radar data and filtering it to obtain only the large scale features, the envelope of the organized storm can be determined. Thus, elements in a weather radar image that correspond to elements within the envelope of the organized storm in the filtered image are generally more predictable than other elements within the weather radar image. The predictability of a selected element can be generated from its filtered value and the variation in the values of the element and its neighboring elements.

The method includes receiving a selected element and neighboring elements from a weather radar image and processing the selected and neighboring elements to generate a processed selected element value. The weather radar image can be a reflectivity image and/or an image derived from weather radar image data. In one embodiment, the derived image is the correlation of two other weather radar images representing two different times. In one embodiment, the processing includes filtering the selected element and the neighboring elements. Optionally, filtering includes iteratively rotating an image filter in coordinate space and applying the filter to the selected element and the neighboring elements.

The method also includes the steps of determining a variability from the selected element and the neighboring elements and generating the predictability of the selected element from the processed selected element value and the variability. The variability can be the standard deviation or the variance of the selected element and the neighboring element. According to one embodiment, the predictability is proportional to a power of the processed element. In other embodiments, the method also includes displaying the predictability.

The apparatus for determining a characteristic of a selected weather radar image element includes an input module for receiving the selected element and neighboring elements, a prediction module and an output module for displaying the characteristic. The prediction module includes a rotation module for iteratively rotating a filter in coordinate space and a filter module for applying each rotated filter to the selected element and its neighboring elements. The prediction module also includes a processor module for determining the characteristic from the selected filtered element values and the sets of filtered element values. In one embodiment, the characteristic is a predictability value. In another embodiment, the output module is a graphical display.

DETAILED DESCRIPTION

The present invention relates to an improvement in the methods of tracking storms in weather radar images. The improvement includes determining the predictability of features in the weather radar image. FIGS. 1 to 7 are substantially the same as the corresponding figures in U.S. Pat. No. 5,959,567, which describes a method for tracking organized storms. These figures are included for a more thorough understanding of the underlying technology upon which the present invention can be based. FIGS. 8 to 14 relate to the inventive aspects of the invention.

Figure 1:
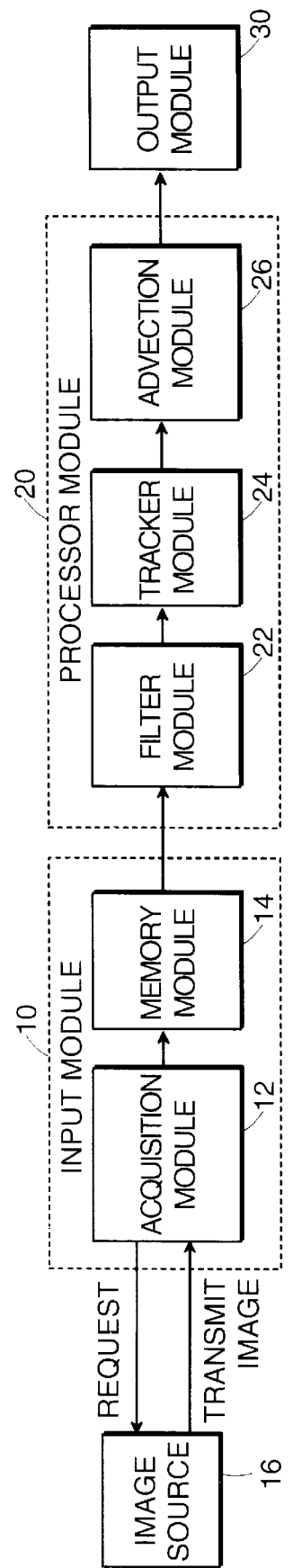
FIG. 1 is a block diagram of a known apparatus for predicting the motion of an organized storm.

FIG. 1 shows a functional block diagram of an apparatus for predicting the motion of an organized storm. An input module 10 receives weather radar image data from a weather radar image source 16. The input module 10 provides the image data to a processor module 20 which generates a predicted weather radar image available at an output module 30.

The input module 10 includes an acquisition module 12 and a memory module 14 to receive and store weather radar images for processing by the processor module 20. The acquisition module 12 initiates transfer of weather radar images from the image source 16 (e.g., remote computer system, satellite receiver and processor, Internet server or other device capable of transmitting weather radar images). The memory module 14 is any device capable of temporary or permanent storage of the weather radar image.

A processor module 20 includes a filter module 22, a tracker module 24 and an advection module 26. The processor module 20 receives multiple weather radar images from the memory module 14 and generates a predicted weather radar image available at output module 30. The filter module 22 applies an image filter 50 (FIGS. 2a–2b) to each weather radar image received from memory module 14 to create a filtered image. The filtered images are transferred to the tracker module 24 which generates track information on the motion of successive local image areas. An advection module 26 applies the track information to one of the unfiltered weather radar images stored in the memory module 14 to generate a predicted weather radar image. The predicted image is available at the output module 30.

Figure 2A:
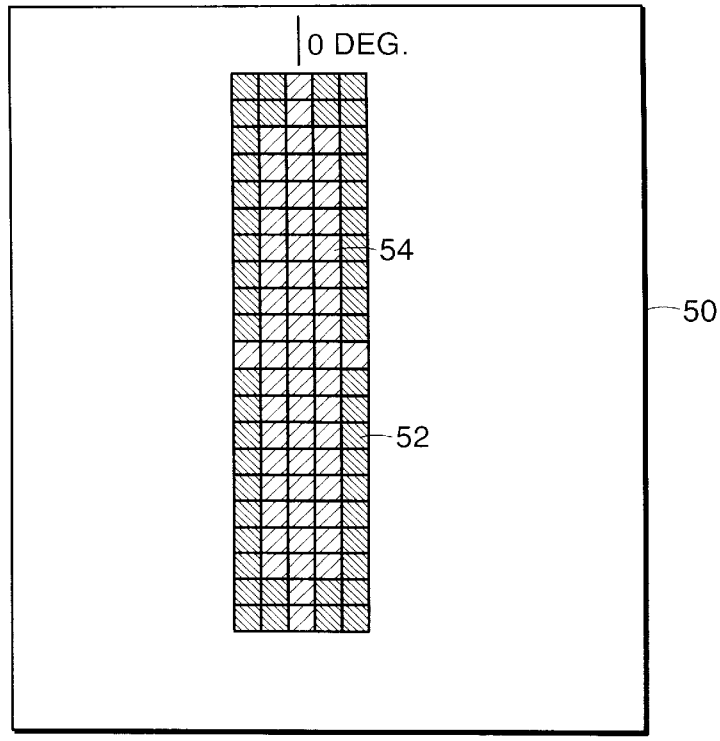
FIGS. 2a and 2b are prior art image filter kernel elements for an elliptical template at 0° and 45°, respectively.
Figure 2B:
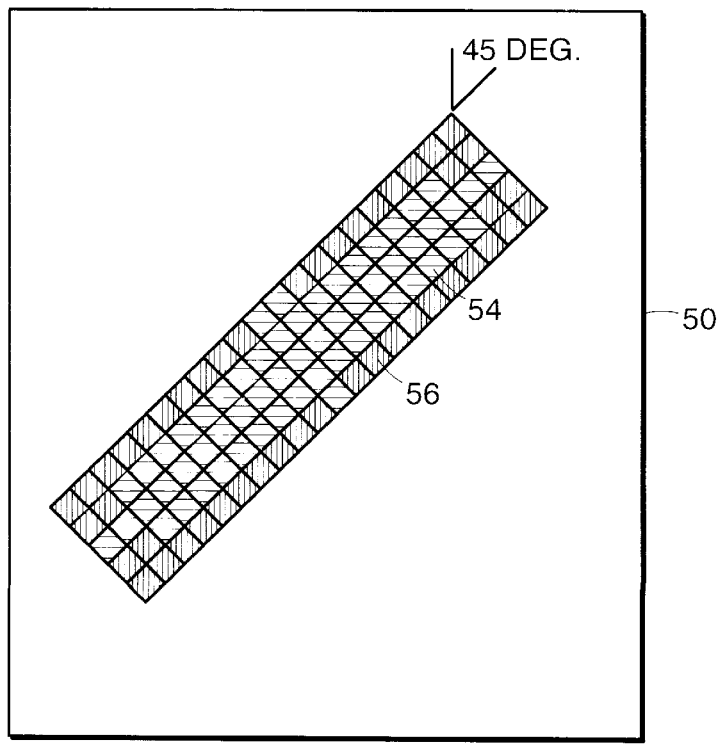

FIG. 2a shows an example of an image filter 50 having an elliptical template 52 with an aspect ratio of about 4:1 as defined by pixels 54. The image filter 50 can employ other template forms, however, the selected template is closely matched to the envelope of the organized storm. Because storms often organize into lines, the utilization of an elliptical template 52 is often advantageous. The template 52 can be rotated within the image filter 50, resulting in a rotated template 56 as depicted in FIG. 2b. Rotation is typically necessary to achieve a template orientation that is matched to the orientation of the envelope of the organized storm.

Figure 3:
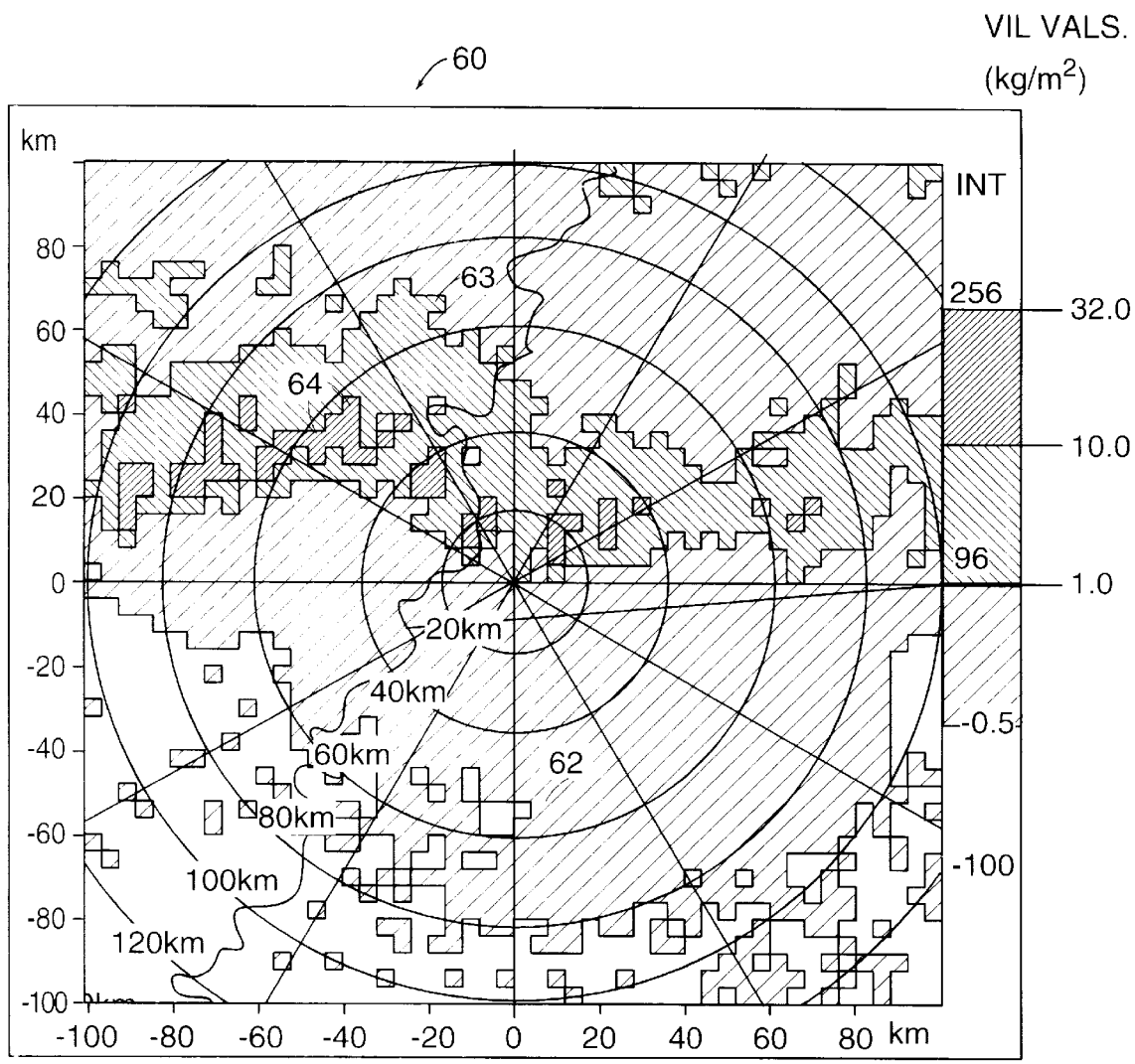
FIG. 3 is an illustration of an unfiltered weather radar image.

Referring to FIG. 3, an unfiltered weather radar image 60 indicates regions of varying intensity 62, 63 and 64. Intensity values typically represent vertical integrated liquid water (VIL), but can also represent other forms of radar reflectivity (e.g., raw reflectivity, composite reflectivity, etc.). Low intensity regions 62 have VIL values less than 1 $kg/m^2$ and indicate insignificant precipitation. Moderate intensity regions 63 have VIL values between 1 $kg/m^2$ and 10 $kg/m^2$. Precipitation in these regions would be noticeable. High intensity regions have VIL values greater than 10 $kg/m^2$ and indicate heavy precipitation. The high intensity regions (or cells) 64 correspond to areas of convective activity with lifetimes typically 20 minutes or less. The image filter 50 is applied to each pixel in the weather radar image 60 for a series of template orientations defined by an incremental rotation angle. For example, an increment of 10° can be used resulting in 18 different elliptical template orientations. The image filter 50 is designed to return a large value when the underlying image nearly matches the elliptical template 56. The maximum value at each pixel resulting from the application of all orientations of the template 56 is retained.

Figure 4:
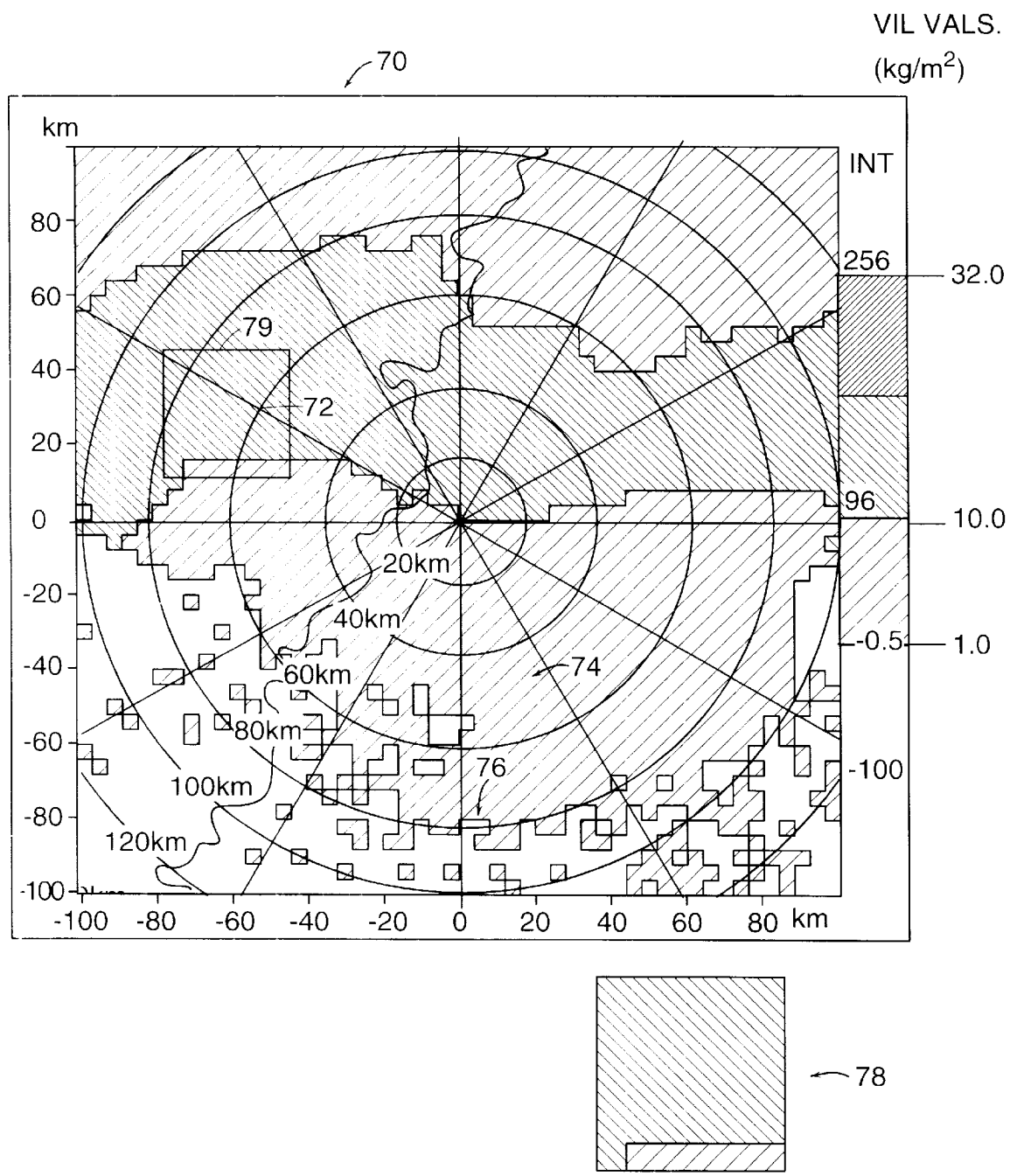
FIG. 4 is an illustration of a weather radar image after application of a prior art image filter.

FIG. 4 shows a filtered weather image 70 defined by the array of maximum pixel values returned by the filtering process. The filtered image 70 includes regions of moderate intensity 72 and light intensity 74. The boundary 76 of the light intensity region 74 approximates the envelope of the storm, however, the small scale high intensity features 64 of the unfiltered image 60 are no longer apparent. Once the image filter 50 has been applied to each weather radar image 60, the resulting filtered image 70 is passed to the tracker module 24.

Figure 5:
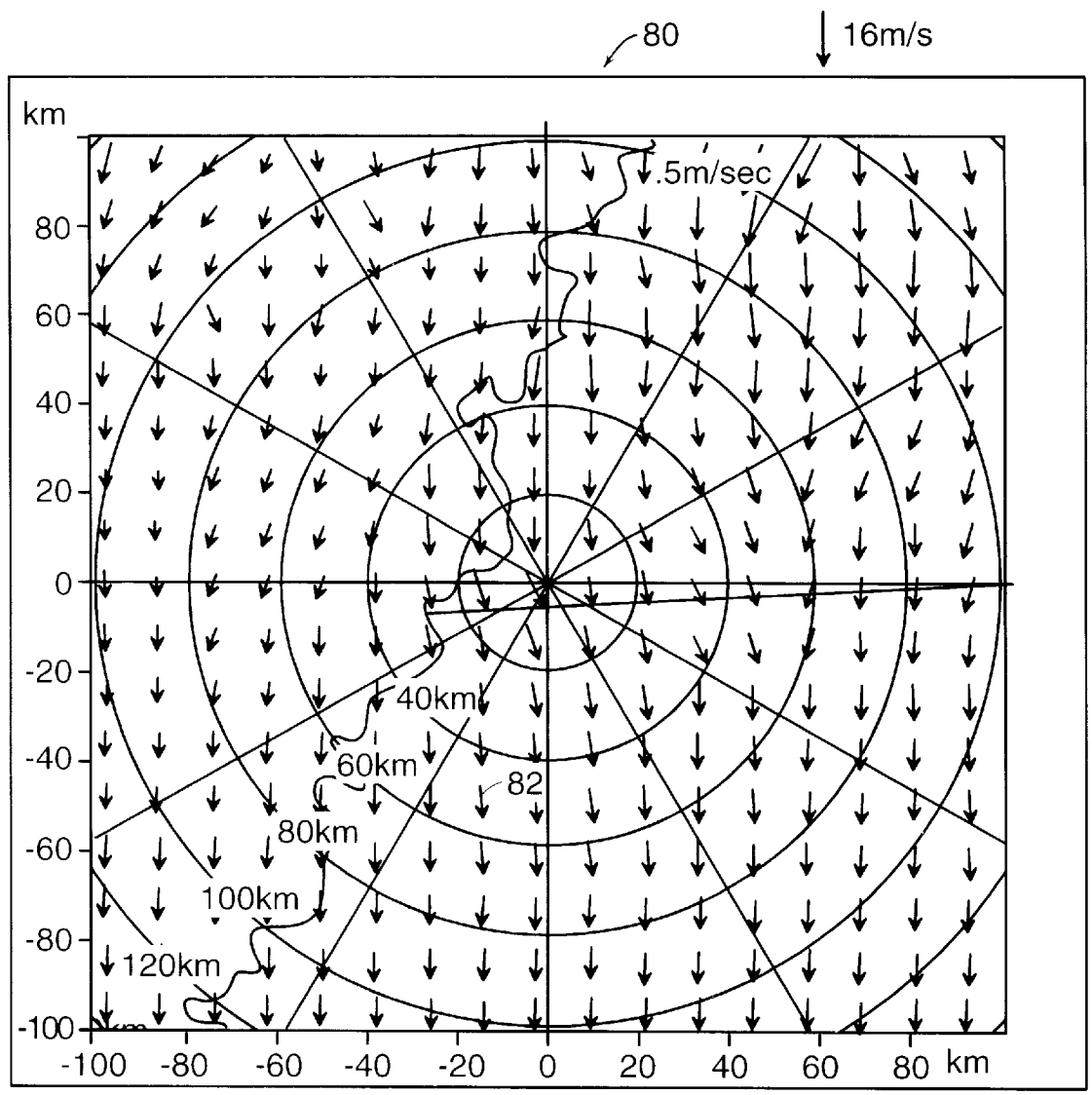
FIG. 5 is a graphical representation of track vectors generated by an image tracker.
Figure 6:
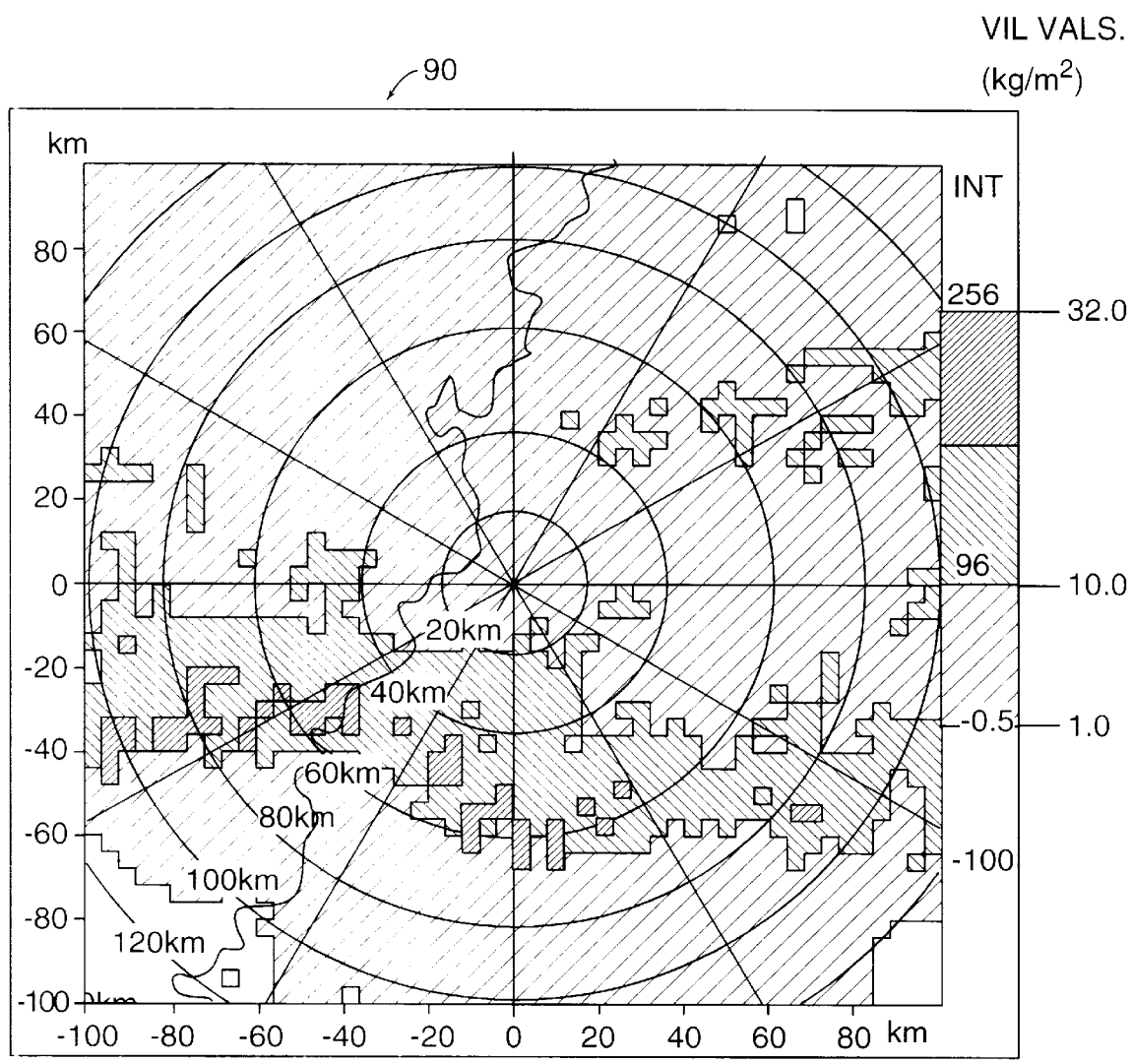
FIG. 6 is an illustration of a predicted weather radar image generated by known prediction methods.

FIG. 5 shows an array 80 of track vectors 82 describing the local motion of the storm occurring during the time interval between images 60. The array 80 generated by the tracker module 24 is the result of correlating a local subimage 79 of a prior filtered image 70 with a subimage 79 of a more recent filtered image 70. Referring to FIG. 6, the track vectors 82 are applied by the propagation module 26 to one of the unfiltered weather radar images 60 to generate a predicted weather radar image 90 of the organized storm. Pixel values in the predicted weather radar image 40 are more likely to correctly predict storm conditions in a geographical location when the corresponding pixel lies with a region (i.e., an envelope) representative of an organized storm. Small scale, high intensity features 42 in the predicted weather radar image 90 which exist in isolation, however, are generally less likely to occur at their respective geographical location at the predicted time.

Figure 7:
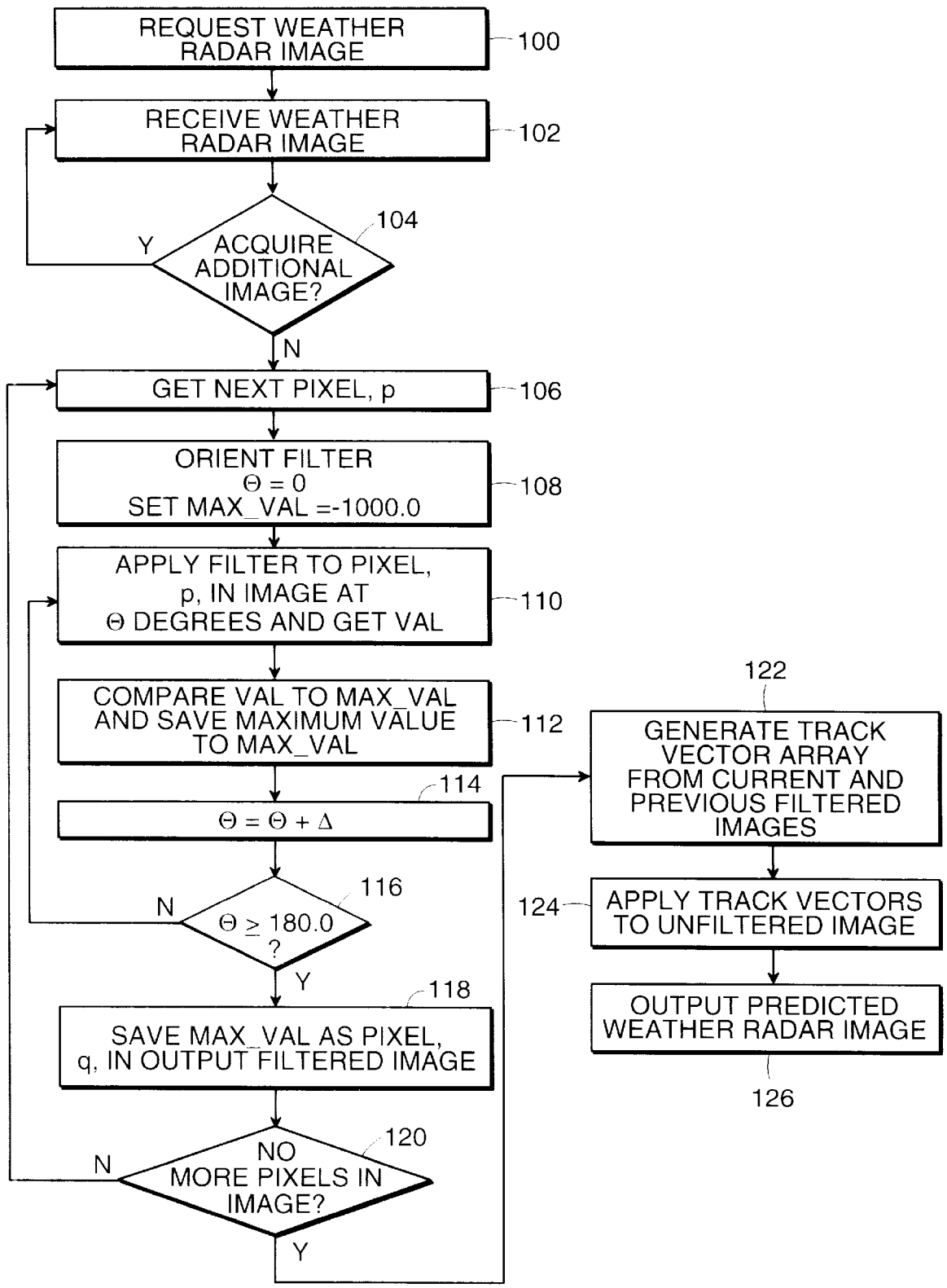
FIG. 7 is a flowchart representation of a prior art method for predicting the motion of an organized storm.

The flowchart in FIG. 7 describes one implementation of a known method as a series of method steps. At step 100, a request for transfer of a weather radar image is made to an image provider and, at step 102, a weather radar image is received. Step 104 determines if additional images must be obtained. If additional images are required, steps 100 and 102 are repeated. At step 106, the method is applied to the first unfiltered image pixel p. At step 108, the filter orientation angle θ is initialized at 0° (i.e., no rotation with respect to the unfiltered image) and the filtered image is initialized at all points to a physically unrealizable value (e.g., −1000). In step 110, the filter oriented at θ is applied to the current point p in the unfiltered image and a value VAL is calculated. At step 112, VAL is compared with the previously stored maximum value MAX_VAL for the point in the unfiltered image and the greater of the two values is saved as MAX_VAL. At step 114, the filter orientation angle θ is increased by an incremental angle Δ. At step 116, if θ is less than 180°, the method returns to step 110. However, if θ is at least 180°, the method proceeds to step 118 and MAX_VAL is saved as the value for the corresponding pixel p' in the filtered image. In step 120, the method is directed back to step 106 if there are still unprocessed pixels in the unfiltered image. However, if all pixels in the unfiltered image have been processed, the method continues to step 122 where an array of track vectors is generated from the previous and current filtered images. At step 124, the array of track vectors is applied to one of the unfiltered images to advect the unfiltered image to a future time (i.e., generate a predicted image). At step 126, the predicted weather radar image is provided to an output device for viewing or transmission.

Figure 8:
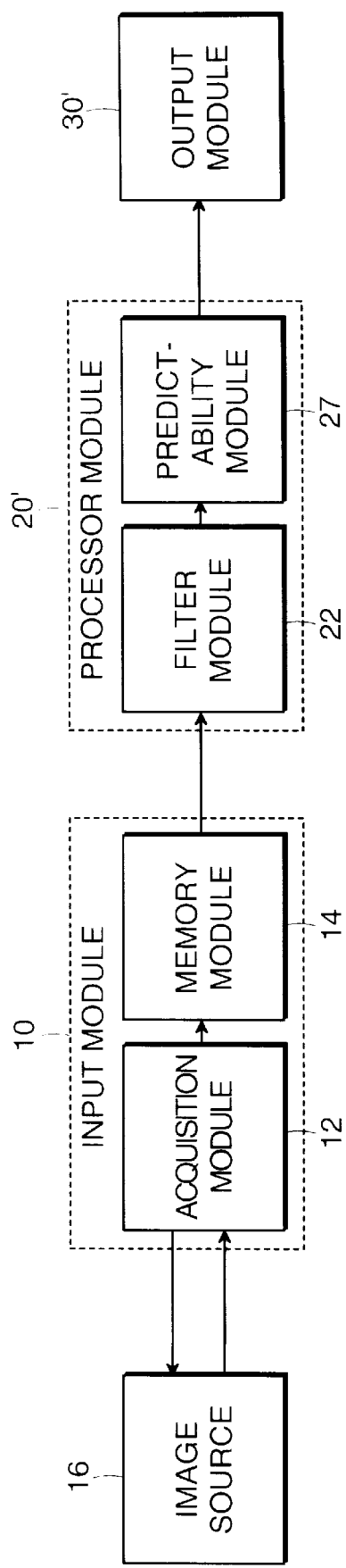
FIG. 8 is a block diagram of an apparatus for determining the predictability of a weather radar image according to the present invention.

FIG. 8 shows a block diagram of an apparatus for determining the predictability of a weather radar image. The input module 10 includes an acquisition module 12 and a memory module 14. A request for a weather radar image is transmitted by the acquisition module 12 to an image source 16. In response, the image source 16 transmits a weather radar image back to the acquisition module 12 which stores the image in a memory module 14. The processor module 20' includes a filter module 22 and a predictability module 27. The filter module 22 generates a filtered image for a weather radar image retrieved from the memory module 14. The filtered images from the filter module 22 are transferred to the predictability module 27 which generates predictability values (i.e., predictabilities) for pixels in the weather radar image. The predictabilities are available at the output module 30' for display or subsequent processing. Optionally, the processor module 20' also includes a tracker module 24, an advection module 26 and/or an output module 30 capable of providing a predicted weather radar image (see FIG. 1).

Figure 9:
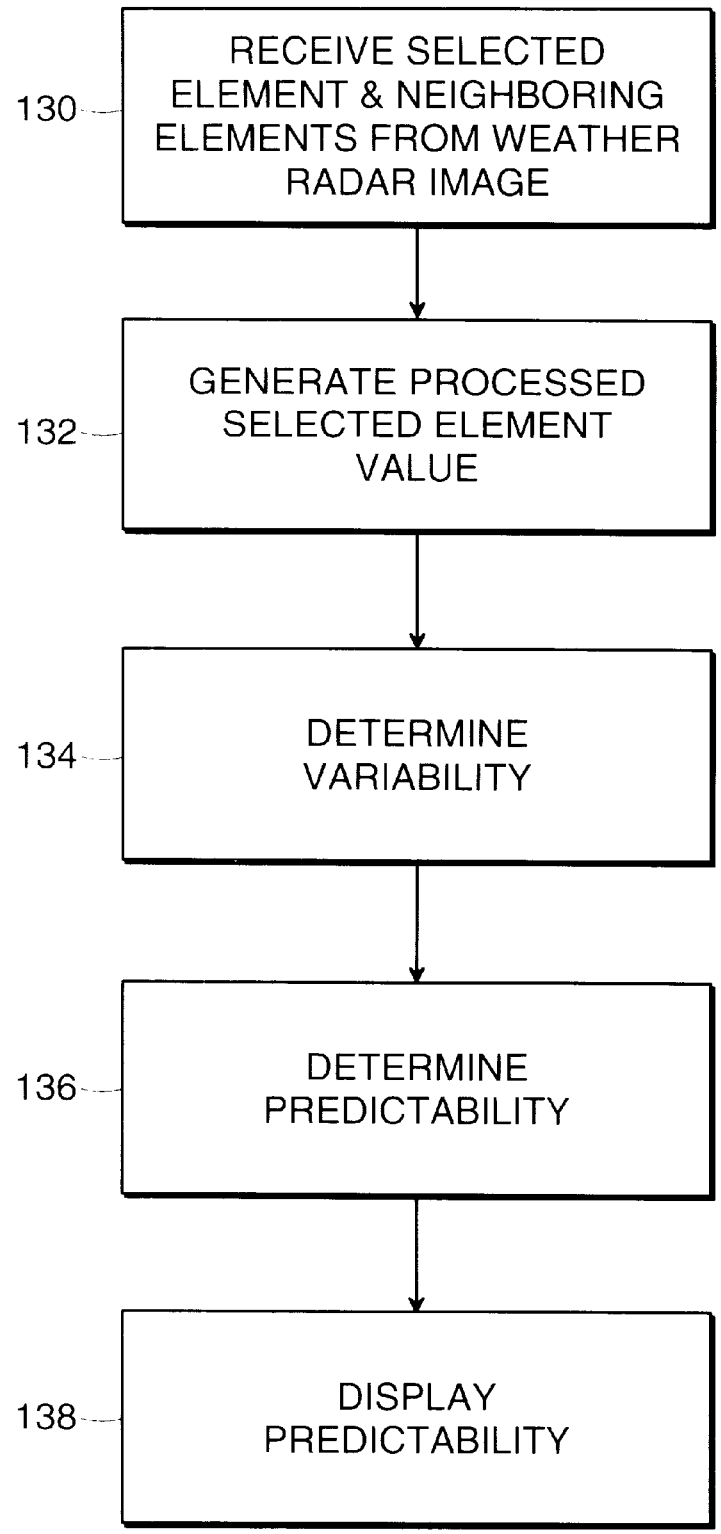
FIG. 9 is a flowchart representation of a method for determining predictability values for a weather radar image according to an embodiment of the invention.

FIG. 9 depicts a method for determining predictability values for a weather radar image according to one embodiment of the invention. At step 130, a selected element in a weather radar image and neighboring elements are received. In step 132, a processed selected element value is generated from the values of the selected element and the neighboring elements. In one implementation of the method, neighboring elements include pixels which lie within the template 52 of an image filter 50 applied to the selected pixel. In step 134, a variability is determined from the values of the selected element and neighboring elements. The variability can be the standard deviation, variance or any quantity characterizing the variation in element values. At step 136, the predictability of the selected element is determined from the processed selected element value and the variability. In one embodiment the predictability of the selected element is high if the processed selected element value is high and/or the variability is low. In a further embodiment the predictability is based on a ratio of the processed selected element value and the variability. In step 138, the predictability is displayed. In one embodiment, the predictability is displayed on a graphical display unit. In a further embodiment, the predictability is displayed as a color according to a predetermined color-coded format.

Figure 10:
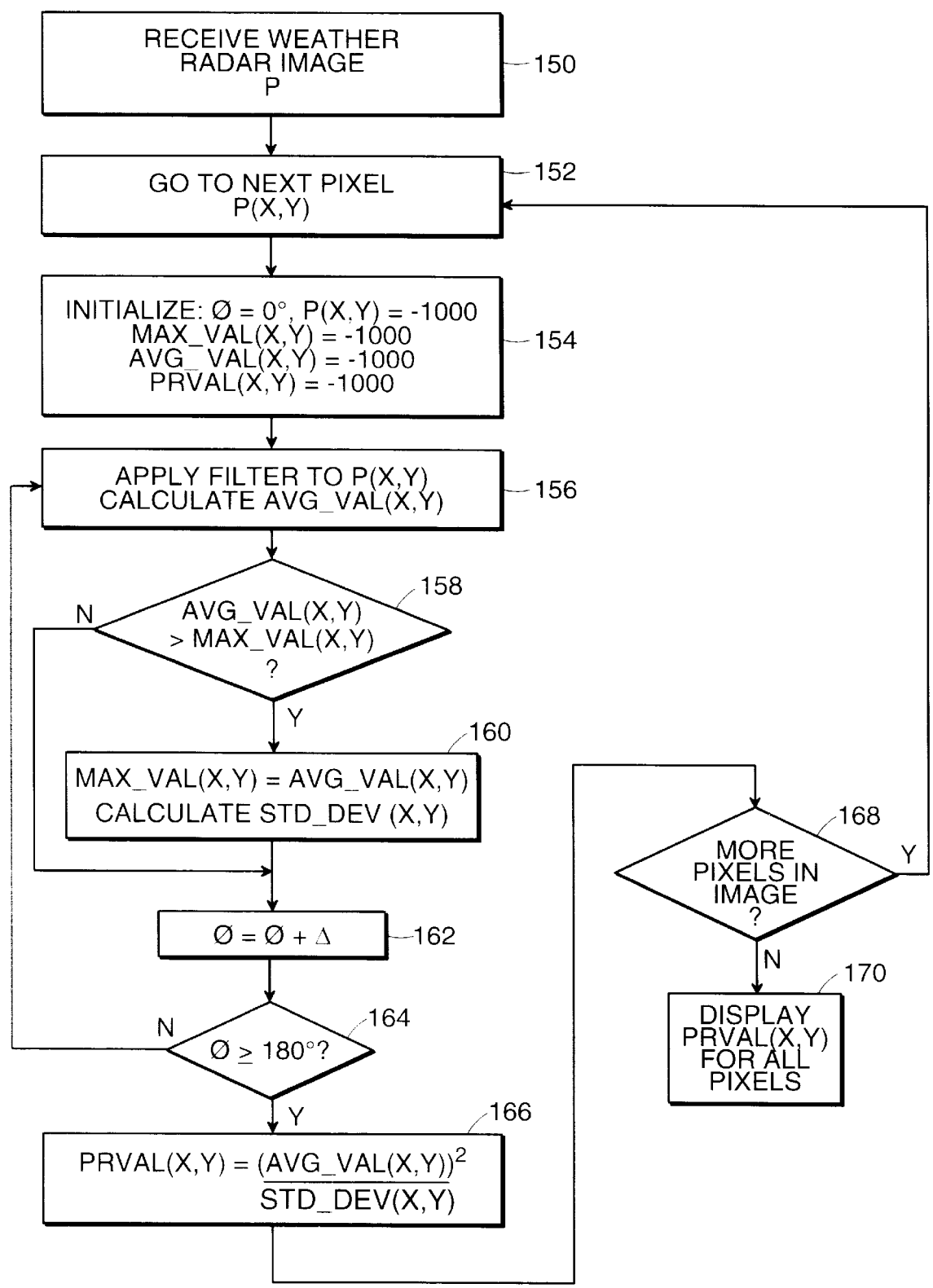
FIG. 10 is a flowchart representation of a method for determining predictability values for a weather radar image according to an embodiment of the invention.

FIG. 10 depicts a method for generating a predictability image from a weather radar image according to an embodiment of the invention. At step 150, a weather radar image P is received and, at step 152, a pixel P(x,y) selected for processing (i.e., the first pixel for a new image 60) is identified. Variables used to determine the predictability value PRVAL(x,y) for the pixel P(x,y) are initialized in step 154. Initialization includes setting the filter orientation angle θ to 0° and setting the variables and the predictability value PRVAL(x,y) to a physically unrealizable value (e.g., −1000). In step 156, the filter 50 oriented at θ is applied to the current pixel P(x,y) in the unfiltered weather radar image 60. A filtered image value AVG_VAL(x,y) equal to the average value of all pixel values within the filter 50 is calculated. At step 158, AVG_VAL(x,y) is compared with the previously stored maximum value MAX_VAL(x,y) for the current pixel P(x,y) in the unfiltered image 60. At step 160, if AVG_VAL(x,y) exceeds MAX_VAL(x,y) then MAX_VAL(x,y) is assigned a new value equal to AVG_VAL(x,y) and the standard deviation STD_DEV(x,y) of the pixels inside the image filter 50 is determined. However, if AVG_VAL(x,y) does not exceed MAX_VAL(x,y), the values of MAX_VAL(x,y), and STD_DEV(x,y) are not changed. At step 162, the filter orientation angle θ is increased by an incremental angle Γ. At step 164, if θ is less than 180°, the method returns to step 156 to apply the image filter 50 at the new filter orientation angle θ. At step 164, if θ is at least 180°, the method proceeds directly to step 166 where the predictability value PRVAL(x,y) for the pixel P(x,y) is calculated using the following equation:

$$PR\_SCORE(x, y) = \frac{(AVG\_VAL(x, y))^2}{STD\_DEV(x, y)}. \tag{1}$$

In step 168, if it is determined that there is at least one more predictability value to calculate, the method returns to step 152. If all predictability values have been determined, a predictability map is generated from all values of PRVAL(x,y) in step 170.

In other embodiments, the predictability value PRVAL(x, y) is generated from other functional relationships based on MAX_VAL(x,y) and the statistical distribution of pixel values within the template 52 of the image filter 50 for the orientation θ where MAX_VAL(x,y) is at a maximum. In one embodiment, the image filter 50 is isotropic and no filter rotation is performed for the calculation of MAX_VAL(x, y).

Typically, a pixel's predictability is high if neighboring pixels fill the template 52 of the image filter 50 with substantially uniform values. For example, a pixel in an unfiltered weather radar image 60 which lies well within the envelope of an organized storm will have a high predictability because its neighboring pixels located in the template 52 of the image filter 50 have relatively high intensity values and the variations between pixel values within the image filter 50 are small. Conversely, a pixel located in a small-scale high intensity feature (e.g., an isolated convective cell or airmass storm) of an unfiltered weather radar image 60 has a relatively low predictability even if it has a high intensity value.

Figure 11A:
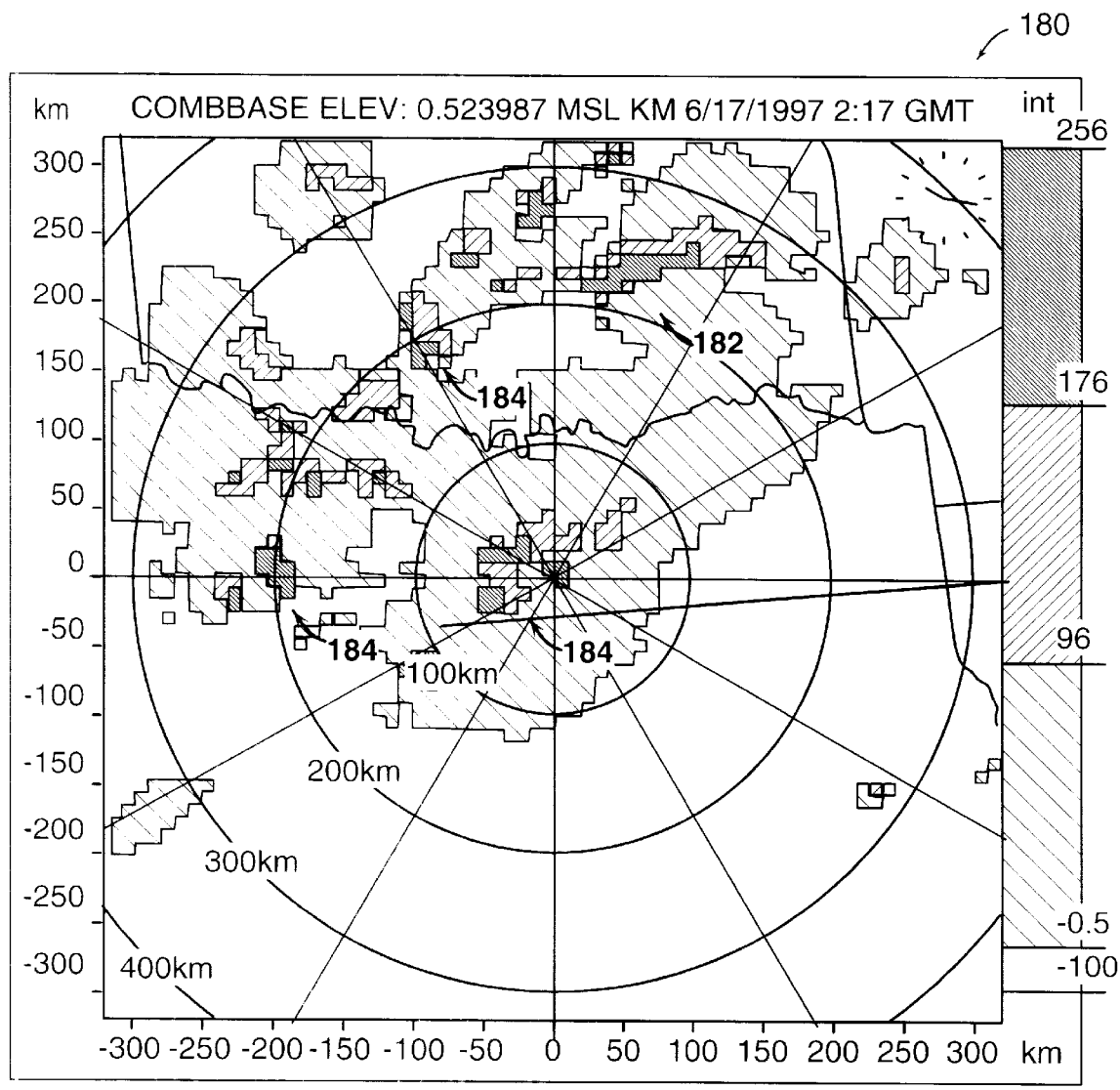
FIGS. 11A and 11B are illustrations of an unfiltered weather radar image and a corresponding predictability image, respectively, generated according to an embodiment of the invention.
Figure 11B:
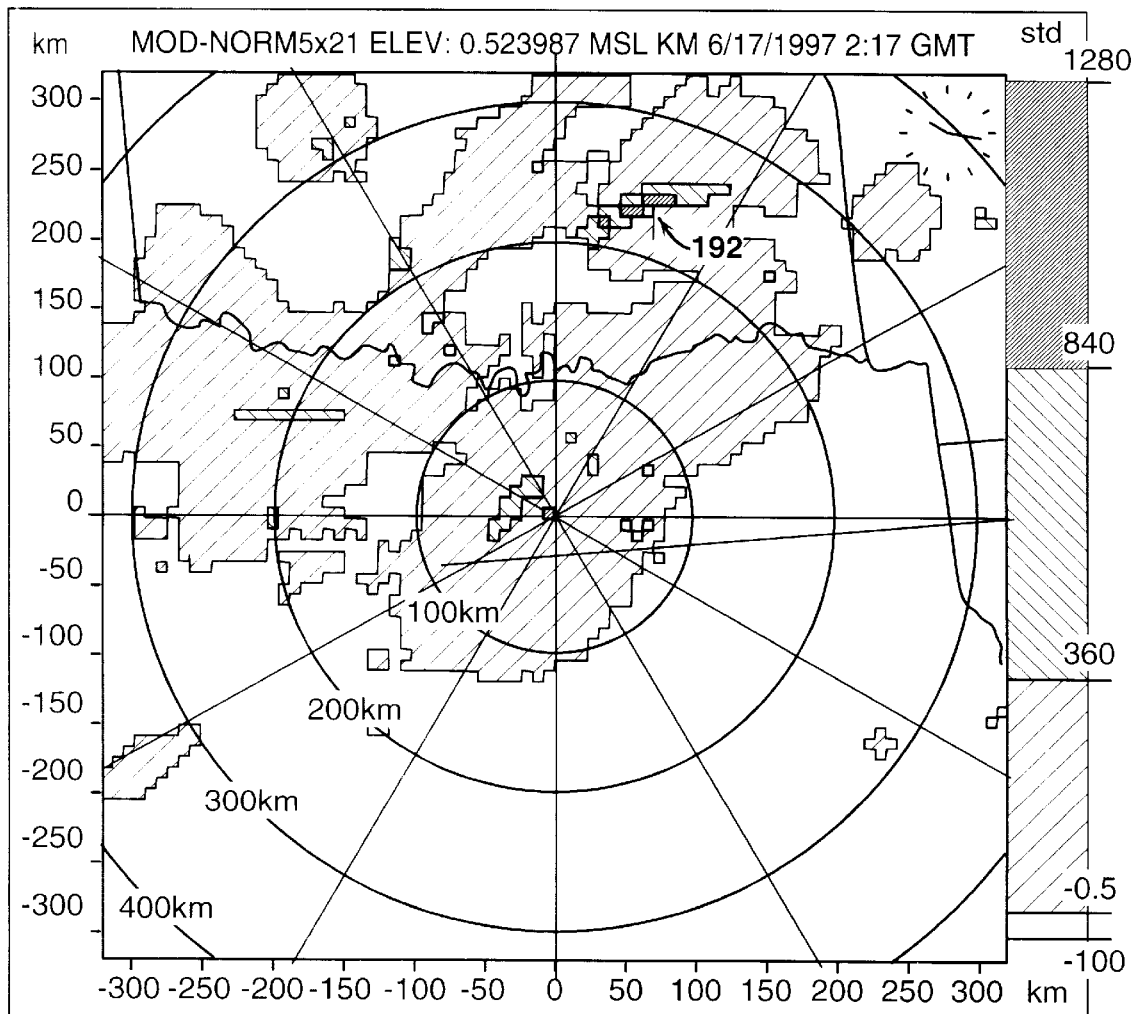

FIG. 11A shows an exemplary unfiltered weather radar image 180 indicating an organized storm 182 having an organization (i.e., spatial structure) indicative of longevity and several airmass storms 184. The location of the organized storm 182 is more predictable than the location of the other storms 184 in longer term predictions (e.g., one hour). FIG. 11B shows the predictability image 190 generated from the unfiltered weather radar image 180. Except for a small region 192 of high predictability corresponding to the organized storm 182, low predictability is indicated.

Figure 12A:
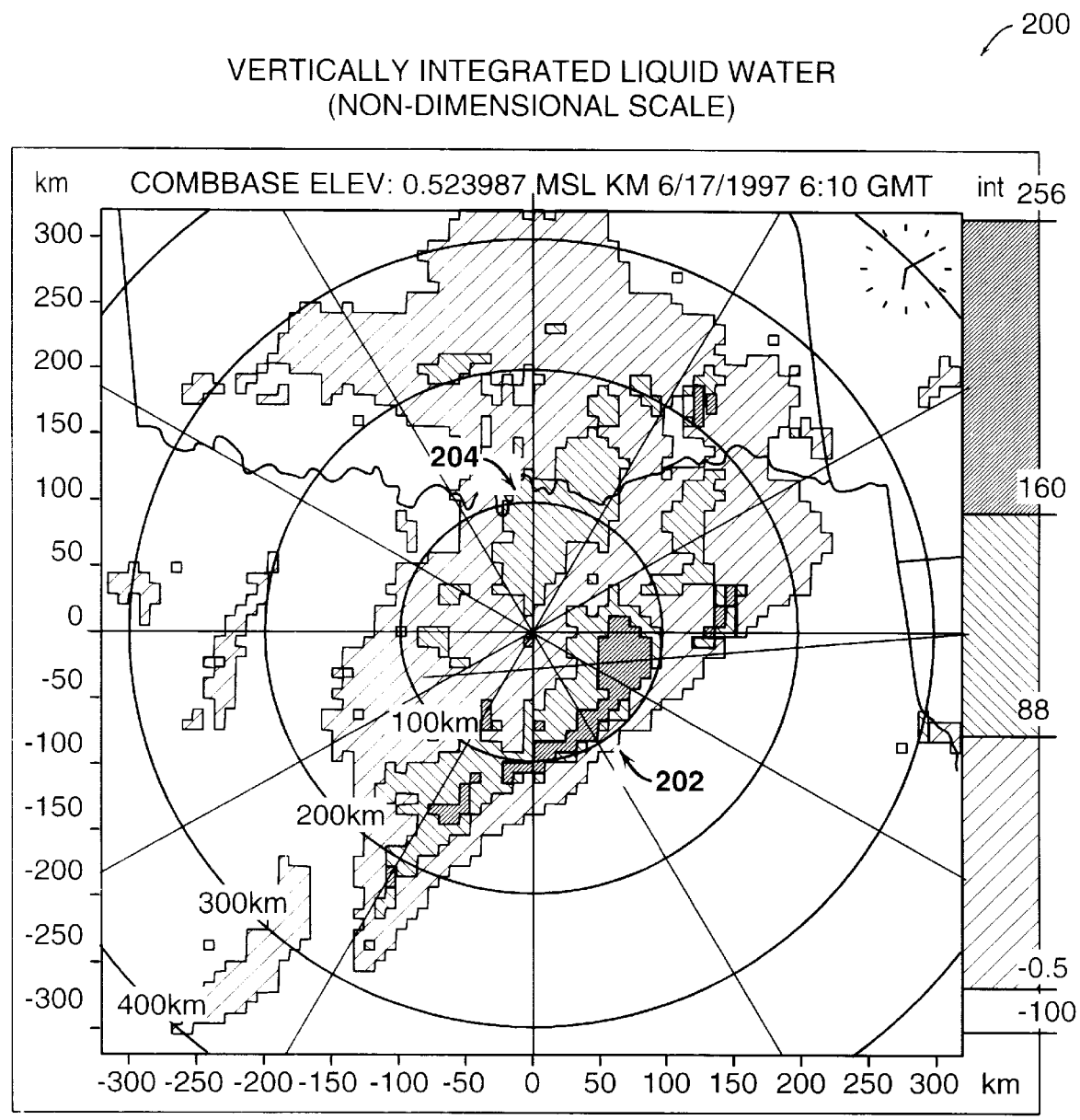
FIGS. 12A and 12B are illustrations of an unfiltered weather radar image and a corresponding predictability image, respectively, generated according to an embodiment of the invention.
Figure 12B:
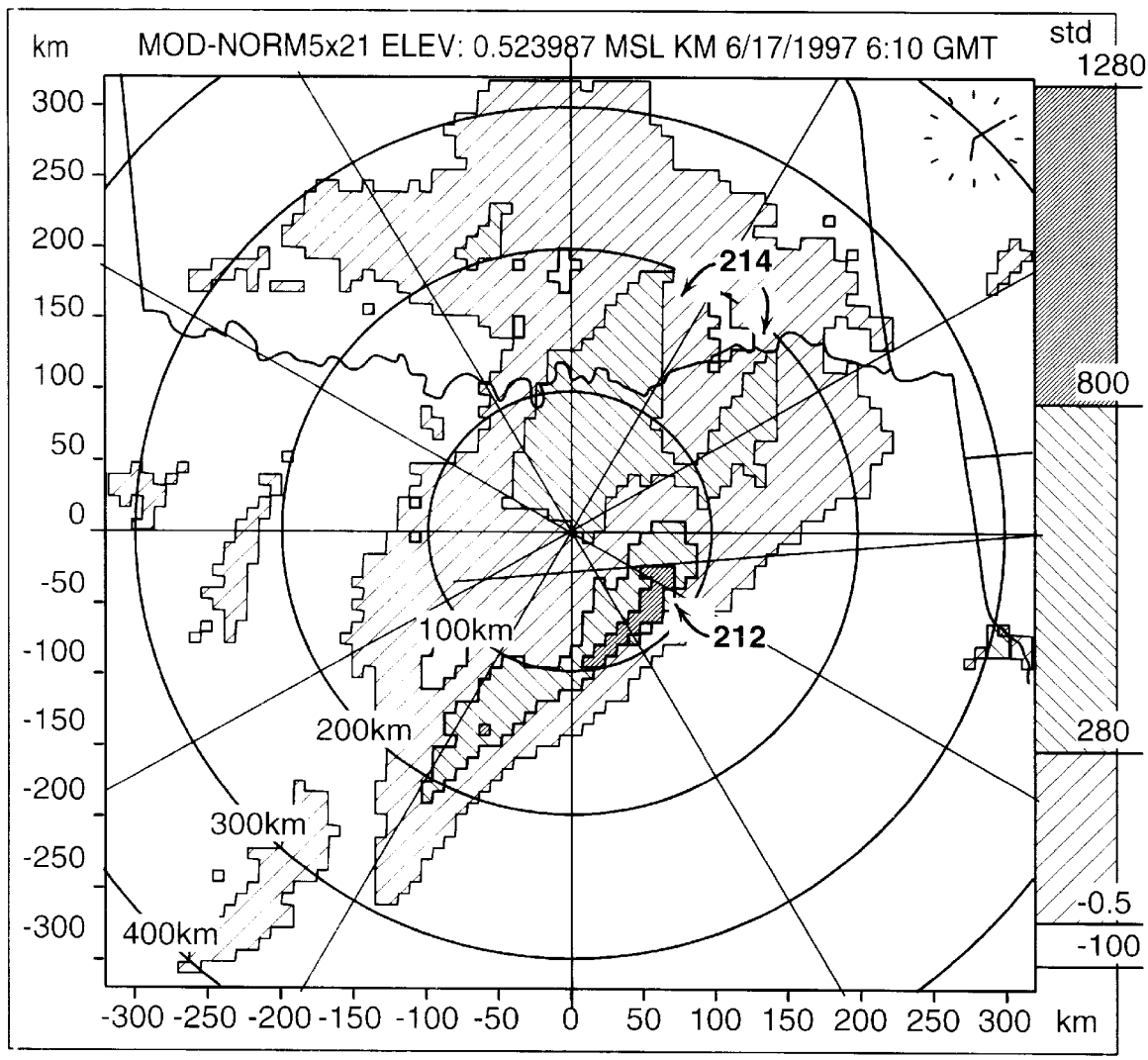

FIG. 12A shows an unfiltered weather radar image 200 corresponding to the same geographical location as the weather radar images 180 and 190 in FIGS. 11A and 11B, respectively. The image 200 indicates the presence of an organized storm 202 having high intensity values organized in a substantially linear distribution oriented from the southwest (lower left) to the northeast (upper right). A stratiform shield 204 having associated moderate intensity values is situated to the north of the line storm 202. The corresponding predictability image 210 is shown in FIG. 12B. An extended linear region 212 of high predictability is substantially coincident with the high intensity pixels of the line storm 202. Moderately high predictability values are also evident in regions 214 corresponding to the stratiform shield 214. Thus, these regions 212 and 214 can be predicted to persist at least one hour.

Figure 13:
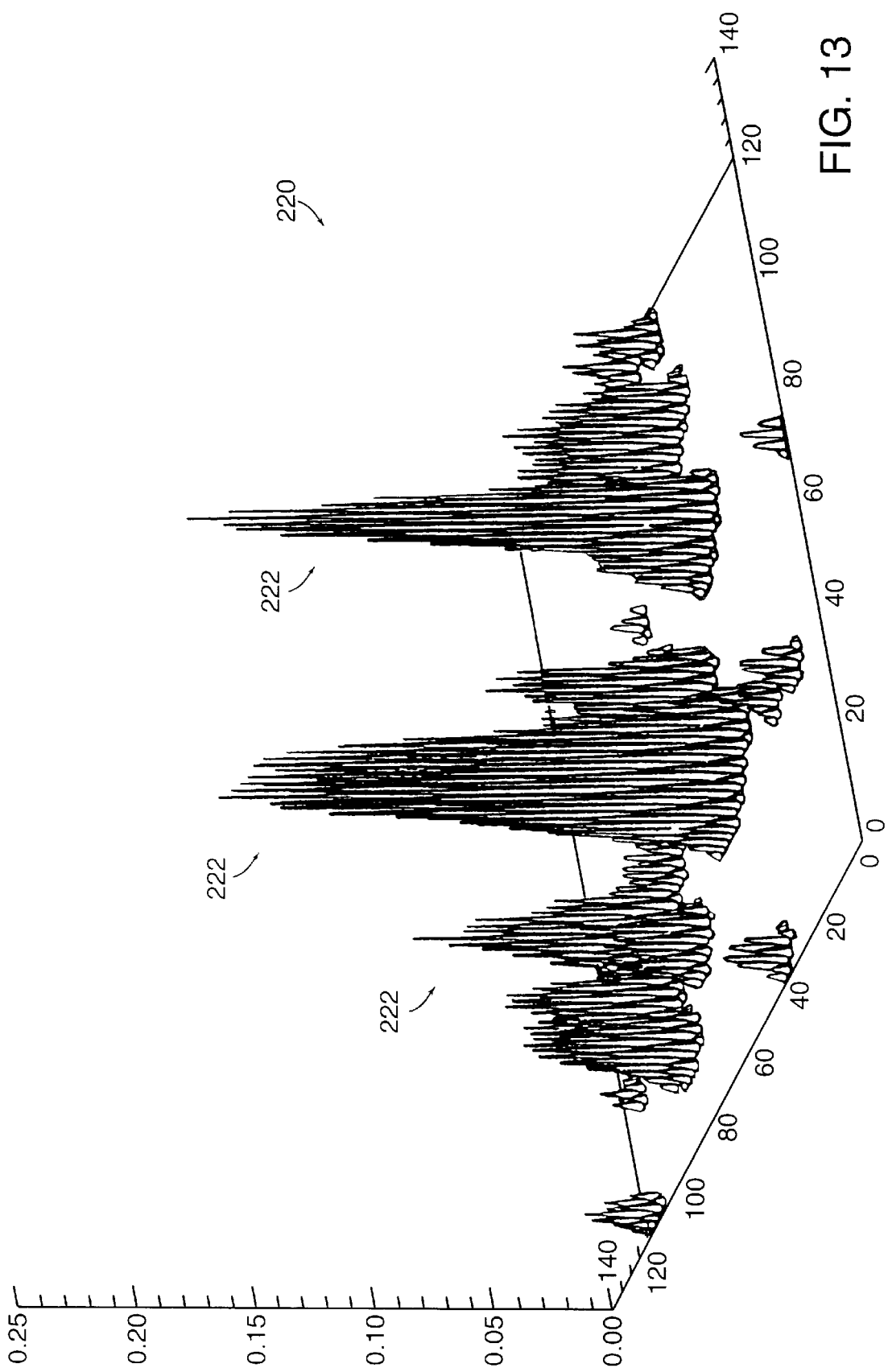
FIG. 13 is an illustration of a time lagged autocorrelation surface of a low predictability weather radar image.

FIG. 13 depicts a correlation surface 220 generated by autocorrelating a time lagged pair of weather radar images. The source weather radar images (not shown) include spotty air mass cells but contain no large scale features indicative of organized storms. As a result, the correlation surface 220 includes multiple spikes 222 of relatively low values. Thus, the numerator of Equation (1) is small, even in the neighborhood of the spikes 222, and the denominator of Equation (1) is large due to the high standard deviation for any pixel on the correlation surface 220. As a result, the predictability values of the pixels in the corresponding weather radar image are low.

Figure 14:
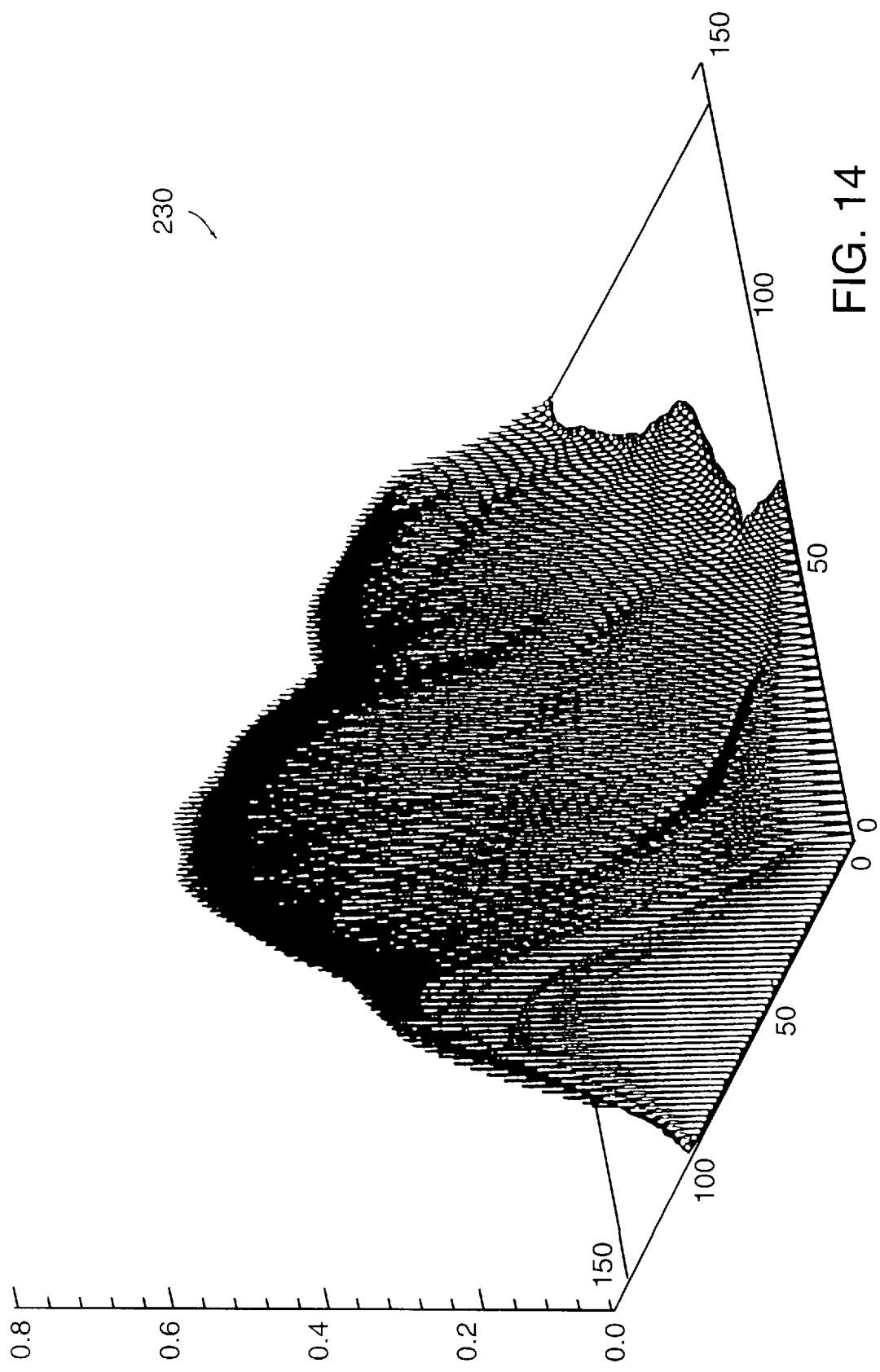
FIG. 14 is an illustration of a time lagged autocorrelation surface of a weather radar image having a high predictability feature.

FIG. 14 shows a correlation surface 230 also generated by autocorrelating a time lagged pair of weather radar images. The source images (not shown) include a more predictable line storm feature than the source images corresponding to FIG. 13. The pixel values for the correlation surface 230 are relatively high and the surface 230 is relatively smooth. Thus, for most pixels the numerator of Equation (1) is large and the denominator of Equation (1) is small, resulting in relatively high predictability values for most pixels on the surface 230.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for determining predictability of a selected element within a weather radar image comprising:
   receiving the selected element and neighboring elements for the weather radar image;
   processing the selected element and the neighboring elements to generate a processed selected element value;
   determining a variability from the selected element and the neighboring elements; and
   generating the predictability of the selected element from the processed selected element value and the variability.

2. The method of claim 1 wherein the weather radar image is a reflectivity image.

3. The method of claim 1 wherein the weather radar image is derived from weather radar image data.

4. The method of claim 3 wherein the weather radar image is a vertical integrated liquid water (VIL) image.

5. The method of claim 3 wherein the weather radar image is the autocorrelation of another weather radar image.

6. The method of claim 3 wherein the weather radar image is the correlation of two other weather radar images, each of the two other weather radar images representative of different times.

7. The method of claim 1 wherein the elements are pixels.

8. The method of claim 1 wherein the step of processing comprises filtering the selected element and the neighboring elements.

9. The method of claim 8 wherein the step of filtering further comprises rotating a filter in coordinate space and filtering the selected element and the neighboring elements.

10. The method of claim 8 wherein the step of filtering further comprises iteratively rotating the filter in coordinate space and, for each rotation, filtering the selected element and the neighboring elements to generate a processed selected element value.

11. The method of claim 10 wherein the step of rotating further comprises iteratively rotating the filter through 180 degrees.

12. The method of claim 10 further comprising the step of determining a maximum from the plurality of processed selected element values.

13. The method of claim 1 wherein the variability is the standard deviation of the selected element and the neighboring elements.

14. The method of claim 1 wherein the variability is the variance of the selected element and the neighboring elements.

15. The method of claim 1 wherein the predictability is inversely proportional to the variability.

16. The method of claim 1 wherein the predictability is proportional to a power of the processed element value.

17. The method of claim 1 wherein the predictability is proportional to the square of the processed element value.

18. The method of claim 1 further comprising the step of displaying the predictability.

19. The method of claim 18 further comprising displaying the predictability on a graphical display.

20. The method of claim 19 further comprising displaying a color-coded representation of the predictability.

21. A method for determining predictability of a selected element within a weather radar image comprising:
   receiving the selected element and neighboring elements for the weather radar image;
   filtering the selected element and the neighboring elements to generate a set of filtered element values and a selected filtered element value;
   incrementally rotating the filter in coordinate space to generate a rotated filter and, for each rotation, filtering the selected element and the neighboring elements to generate at least one additional set of filtered element values and at least one additional selected filtered element value;
   determining the maximum of the selected filtered element values;
   determining a variability from the sets of filtered element values that were generated from the rotated filter which generated the maximum selected filtered element value; and generating the predictability of the selected element from the maximum selected filtered element value and the variability.

22. An apparatus for determining a characteristic of a selected weather radar image element, comprising:

an input module for receiving the element and neighboring elements within a weather radar image;

a prediction module for determining the characteristic, comprising:

a rotation module for iteratively rotating a filter in coordinate space;

a filter module for applying each rotated filter to the selected element and the neighboring elements to generate a plurality of selected filtered element values and a plurality of sets of filtered element values; and a processor module for determining the characteristic from the plurality of selected filtered element values and the plurality of sets of filtered element values; and an output module for displaying the characteristic.

23. The apparatus of claim 22 wherein the characteristic is a predictability value.

24. The apparatus of claim 22 wherein the element is a pixel.

25. The apparatus of claim 22 wherein the output module is a graphical display.

* * * * *

UNITED STATES PATENT AND TRADEMARK OFFICE
CERTIFICATE OF CORRECTION

PATENT NO. : 6,340,946 B1
DATED : January 22, 2002
INVENTOR(S) : Wolfson et al.

It is certified that error appears in the above-identified patent and that said Letters Patent is hereby corrected as shown below:

Title page,
Item [73], Assignee, should read -- Massachusetts Institute of Technology a Part Interest, Cambridge, MA (US) --.

Signed and Sealed this

Thirtieth Day of August, 2005

JON W. DUDAS
*Director of the United States Patent and Trademark Office*